United States Patent [19]

Ludwig et al.

[11] Patent Number: 5,972,398

[45] Date of Patent: Oct. 26, 1999

[54] METHOD OF AND APPARATUS FOR THE TREATMENT OF MEAT

[75] Inventors: Ralf Ludwig, Tillson, N.Y.; Wolfgang Ludwig, Destin, Fla.

[73] Assignee: WTI, Inc., Kingston, N.Y.

[21] Appl. No.: 09/107,377

[22] Filed: Jun. 30, 1998

[51] Int. Cl.⁶ .............................. A23L 1/31; A22C 9/00
[52] U.S. Cl. ................ 426/281; 426/641; 426/644; 426/645; 426/646; 426/518; 426/519; 99/472; 99/516; 99/532; 99/534
[58] Field of Search .................... 426/281, 641, 426/644, 645, 646, 518, 519; 99/472, 487, 516, 517, 532, 533, 534, 535

[56] References Cited

U.S. PATENT DOCUMENTS

| | | | |
|---|---|---|---|
| 4,029,824 | 6/1977 | Langen | 426/281 |
| 4,036,122 | 7/1977 | Langen | 426/281 X |
| 4,038,426 | 7/1977 | Jespersen et al. | 426/281 X |
| 4,520,718 | 6/1985 | Prosenbauer | 99/535 |
| 4,522,118 | 6/1985 | Simonsen et al. | 99/535 X |
| 4,836,099 | 6/1989 | Thirode | 99/535 X |
| 5,200,223 | 4/1993 | Simonsen | 426/281 |
| 5,307,737 | 5/1994 | Higashimoto | 99/533 |
| 5,323,694 | 6/1994 | Higashimoto | 99/535 |
| 5,362,507 | 11/1994 | Ludwig | 426/281 |
| 5,405,630 | 4/1995 | Ludwig | 426/231 |
| 5,436,017 | 7/1995 | Ludwig et al. | 426/281 |
| 5,449,524 | 9/1995 | Ludwig | 426/281 |
| 5,505,972 | 4/1996 | Ludwig | 426/281 |
| 5,564,332 | 10/1996 | Ludwig | 99/472 |

*Primary Examiner*—Milton Cano
*Attorney, Agent, or Firm*—Herbert Dubno

[57] ABSTRACT

An inline macerating method and apparatus for treating pieces of meat with a liquid wherein the pieces of meat are first injected with the liquid and then drawn by suction through a duct in which the piece of meat is incised by cutting edges extending into the path of the pieces of meat as they traverse the duct. The pieces of meat then pass into a paddle massager or tumbler in which the liquid is massaged into the tissue.

16 Claims, 9 Drawing Sheets

METHOD OF AND APPARATUS FOR THE TREATMENT OF MEAT

SPECIFICATION

FIELD OF THE INVENTION

The present invention relates to a method of and to an apparatus for the processing of meat and, more particularly, to improvements in the injection of pieces of meat with meat-processing solutions, hereinafter referred to as liquid marinades, marinating solutions, tenderizing solutions or the like.

BACKGROUND OF THE INVENTION

In the commonly owned U.S. Pat. Nos. 5,405,630, 5,362,507, 5,564,332, 5,436,017, 5,449,524 and 5,505,972, there are described processes and machines for introducing solutions of various compounds into pieces of meat, including poultry breasts and pieces of red meat, pork products and the like.

These solutions, which can be termed marinades, pickles, tenderizing solutions and the like, can be injected by needle and generally are massaged into the piece of meat by, for example, a paddle massager and/or a rotating-drum tumbler. Reference may be had in this connection to U.S. Pat. Nos. 5,405,630 and 5,564,332.

Details of the types of solutions which may be used can be found in U.S. Pat. Nos. 5,362,507 and 5,436,017 and, where poultry carcasses are injected, differential introduction of the solution is described in U.S. Pat. Nos. 5,449,524 and 5,505,972.

We have found that earlier systems for treating pieces of meat, regardless of the animal source and even regardless of the shape, size, nature of the muscle tissue and like factors, can be improved by additionally incising the piece of meat and/or by subjecting the pieces of meat, after injection, alternately to compression and expansion.

OBJECTS OF THE INVENTION

It is thus the principal object of the present invention to provide an improved method of and apparatus for the treatment of pieces of meat, whereby the penetration and distribution of injected liquids in the pieces of meat can be increased.

Another object of this invention is to provide a method of and an apparatus for treating meat with a tenderizing or other solution which can increase the tenderizing effect by comparison with earlier systems.

Still another object of the invention is to improve a method of and an apparatus for the treatment of meat on an inline basis.

SUMMARY OF THE INVENTION

We have now found that these objects can be readily attained and the penetration and distribution of liquids in pieces of meat, including poultry (for example poultry breasts), pork products (for example hams), red meat products (including roasts), lamb products and the like, can be improved and that such pieces of meat can be additionally tenderized, by sucking (i.e. drawing the pieces of meat by vacuum) the pieces of meat through a duct into the paddle and/or rotating-drum massager after injection of the liquid into the meat and, during the sucking of the pieces of meat through the duct, incising them with cutting edges in a maceration process and/or alternately compressing the pieces of meat and relaxing that compression.

The paddle massager which may be used can be the paddle massager described in U.S. Pat. No. 5,564,332 and, in accordance with the invention, any of the solutions described in the aforementioned patents or others conventionally employed as tenderizing, preservative, marinating and pickle solutions can be used.

According to a feature of the invention, the pieces of meat are initially subjected in the processing line of the invention, to cold injection and the pieces of meat so injected can then be cold pressed before the pieces of meat are collected in a cold storage bin or tank which serves as a feeder for the duct running to the paddle massager.

That duct, through which the pieces of meat are drawn by suction applied to the paddle massager, can have at least one segment with a converging and diverging portion within which the pieces of meat are compressed, and at least one segment, which may be the same as the first mentioned segment, provided with cutting edges extending into the path of the pieces of meat for incising them. The cutting edges can be provided on a ring which can be connected in the duct by flanges or can be provided on inserts received in and removably anchored to a duct segment. The cutting edges may be provided in a flattened region of the duct and, according to the invention, the depth of penetration of the blades into the path of the pieces of meat can be adjustable or variable by replacement of the ring or the blade carrying inserts. According to another feature of the invention, the segment of the duct can be hinged to afford axis to the cutting edges.

The method of the invention can then comprise the steps of:

injecting pieces of meat with a liquid marinade;

sucking the pieces of meat in succession through a duct into a massaging and tumbling drum;

incising each piece of meat with a multiplicity of cutting edges all around each of the pieces as each piece passes through the duct; and massaging the pieces of meat incised in the duct and injected with the marinade in the massaging and tumbling drum to promote penetration of the liquid marinade into and to distribute the liquid marinade in each piece of meat.

In one aspect of the invention the apparatus can comprise:

an injector for injecting pieces of meat with a liquid marinade;

an evacuatable paddle massager for massaging the pieces of meat injected with the marinade;

a duct between the injector and the paddle massager through which the pieces of meat are sucked for introduction into the massager; and a multiplicity of cutting edges in the duct for incising each piece of meat as each piece of meat is sucked through the duct to promote penetration of the liquid marinade into the pieces of meat.

In another aspect the apparatus can comprise:

an injector for injecting pieces of meat with a liquid marinade;

an evacuatable paddle massager for massaging the pieces of meat injected with the marinade; and a duct between the injector and the paddle massager through which the pieces of meat are sucked for introduction into the massager, the duct having in succession a section converging in a direction of displacement of the pieces of meat for compressing the pieces and a section diverging in the direction.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
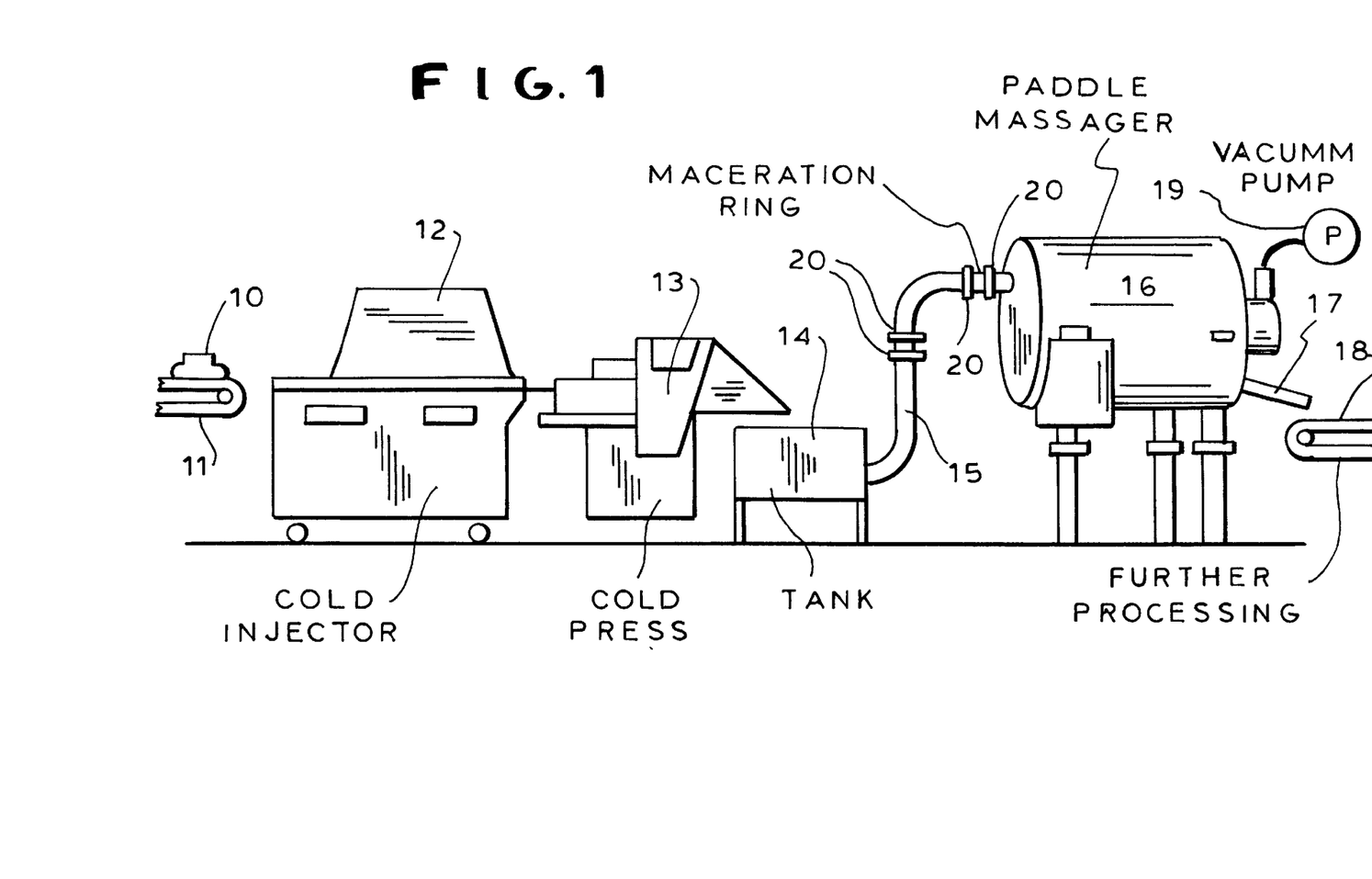
FIG. 1 is a diagrammatic side elevational view of an inline meat processing system illustrating the invention.

In FIG. 1 we have shown the basic elements of a meat processing line, the pieces 10 of meat being supplied via the conveyor 11 to the cold injector 12 which can be of any conventional type (see U.S. Pat. Nos. 5,449,524 and 5,505,972 and the references cited therein).

From the cold injector 12, the pieces of meat, which have been injected with the solution, are supplied to a cold press 13 from which the pieces of meat are delivered to a tank 14, also chilled and serving for intermediate storage of the pieces of meat before they are sucked through the duct 15 into a chilled paddle massager 16 which can be of the type described and illustrated in U.S. Pat. No. 5,564,332. The pieces of meat can be discharged at 17 onto a conveyor 18 for further processing and the vacuum is generated in the paddle massager 16 via a vacuum pump 19.

Figure 4:
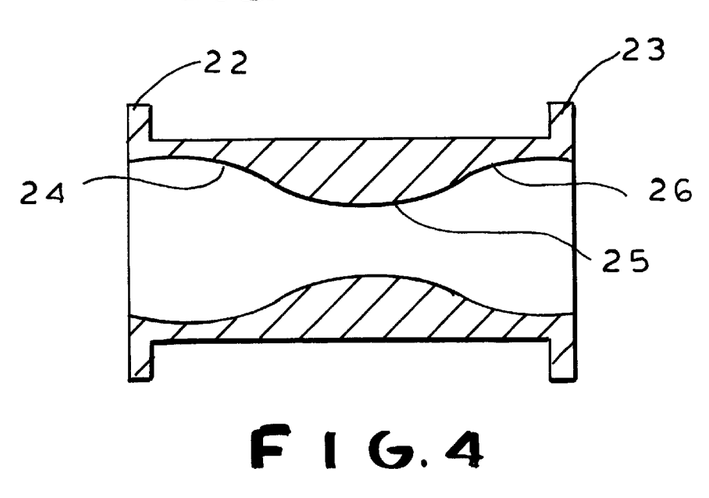
FIG. 4 is a cross sectional view through another section of this duct.

One or more macerating rings 20 may be provided along the duct 15 and the duct can include segments 21 connected by the flanges 22 and 23 to additional duct segments and which, as illustrated in FIG. 4, includes a converging section 24 leading to the constriction 25 and a diverging section 26 downstream of the constriction.

The segment 21 serves for compression and relaxation of the pieces of meat as they are drawn through the duct and can be provided adjacent the macerating ring or rings. Alternatively the macerating ring can be provided as part of the duct segment having the construction. Such constructions will be described in greater detail hereinafter.

The inline maceration system of FIG. 1 thus enables the pieces of meat to be incised by blades which extend into the path of pieces of meat as they are drawn through the duct 15 into the paddle massager.

Figure 2:
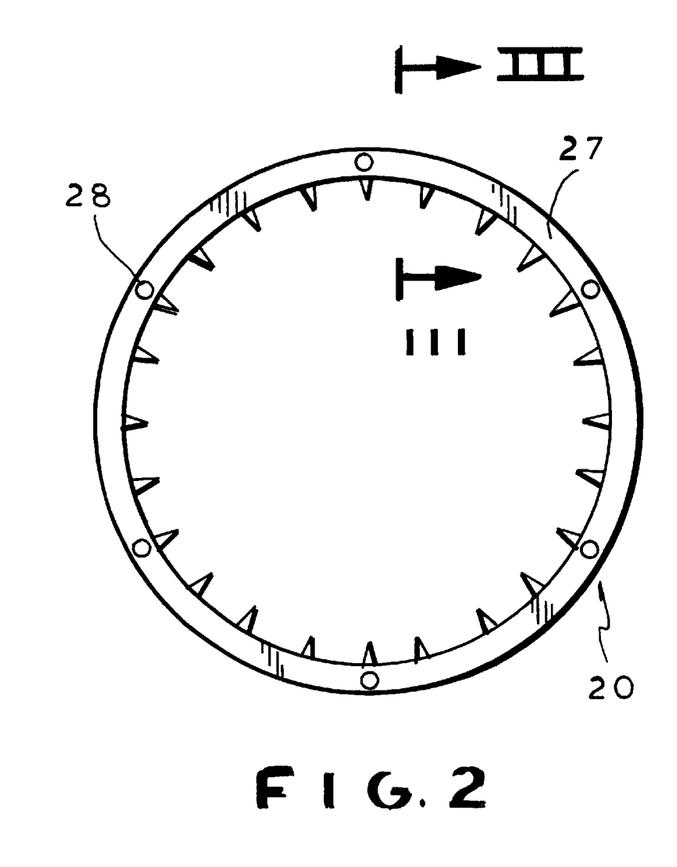
FIG. 2 is an end view off a macerating ring which can be included in the duct of that meat processing line.
Figure 3:
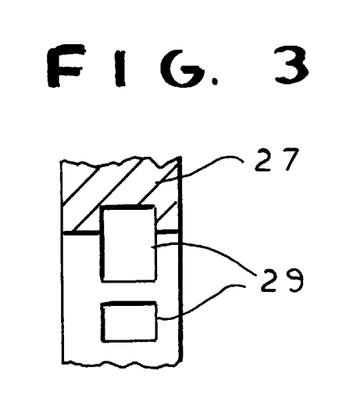
FIG. 3 is a section through the duct along the line III—III thereof.

Various configurations of the macerating units can be provided and in FIGS. 1–3, the macerating ring 20 is shown to comprise an annular body 27 having holes 28 which can be traversed by bolts attaching the ring between the flanges of the duct segment and provided with blades or cutting edges 29. The blades 29 can be set so that they project to different radial extents from the ring 27 and thus incise the piece of meat to different depths depending upon the nature of the pieces of meat which are being processed.

Figure 5:
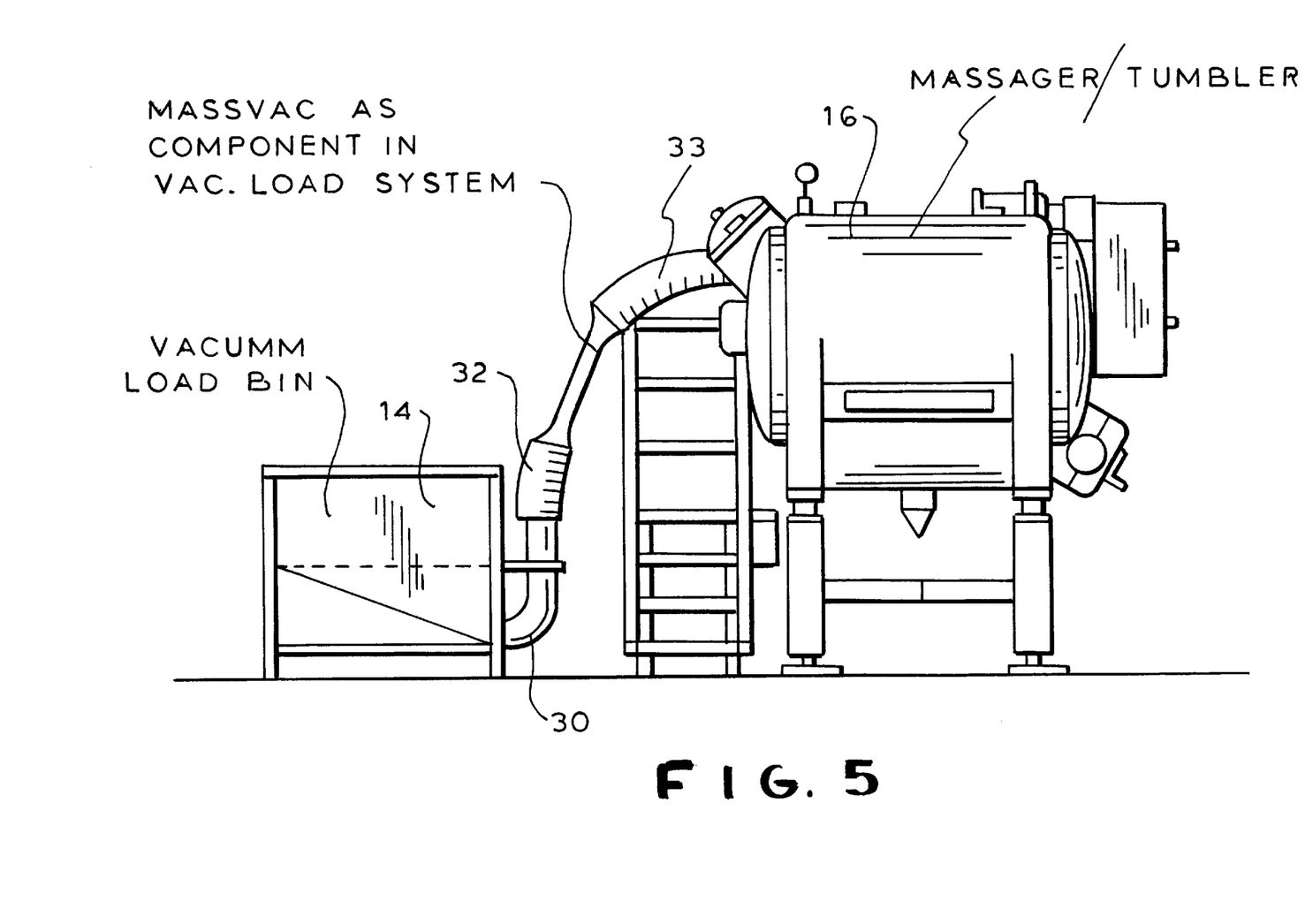
FIG. 5 is a detail view of a portion of the processing line.

The duct connecting the vacuum loading bin or tank 14 with the massager or tumbler can, as represented at 30 in FIG. 5, include a constricted segment 31 provided with the blades and between flexible segments 32 and 33. Instead of a paddle massager, a tumbler massager may be used. If desired, the massager may include a rotating tumbling drum in addition to rotating paddles.

Figure 6:
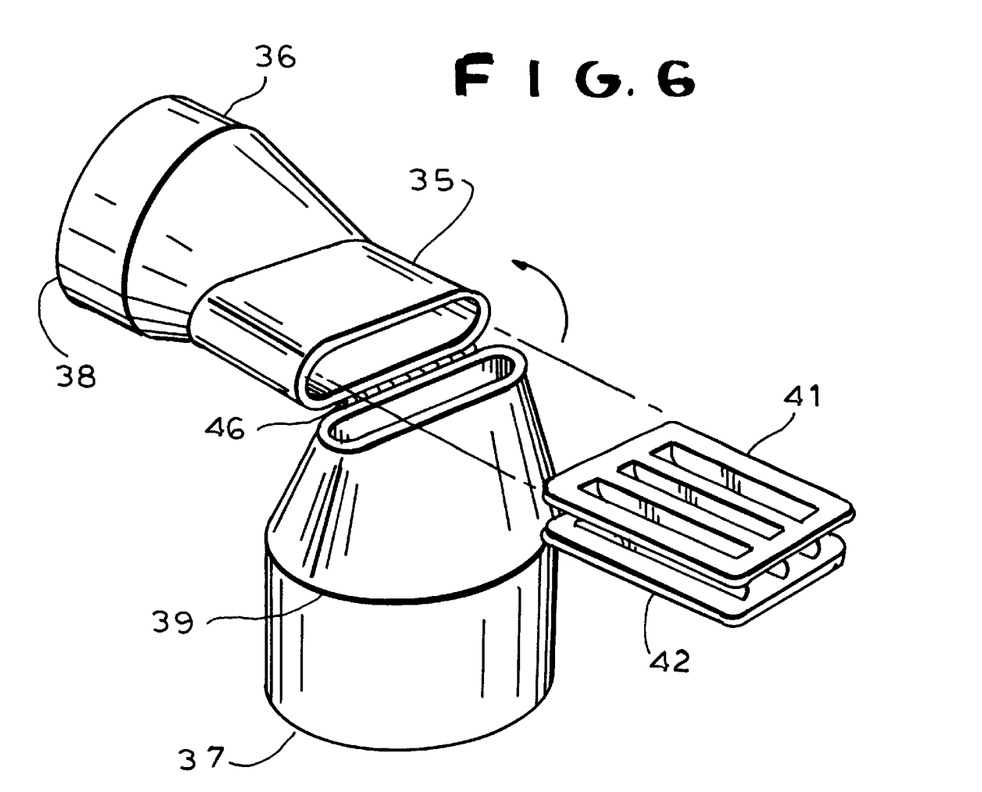
FIG. 6 is an exploded perspective view showing a part of a duct segment according to the invention.
Figure 7:
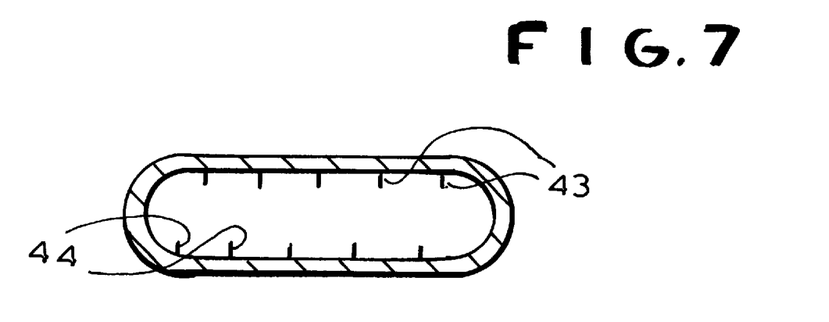
FIG. 7 is a cross sectional view through that portion of the duct.
Figure 8:
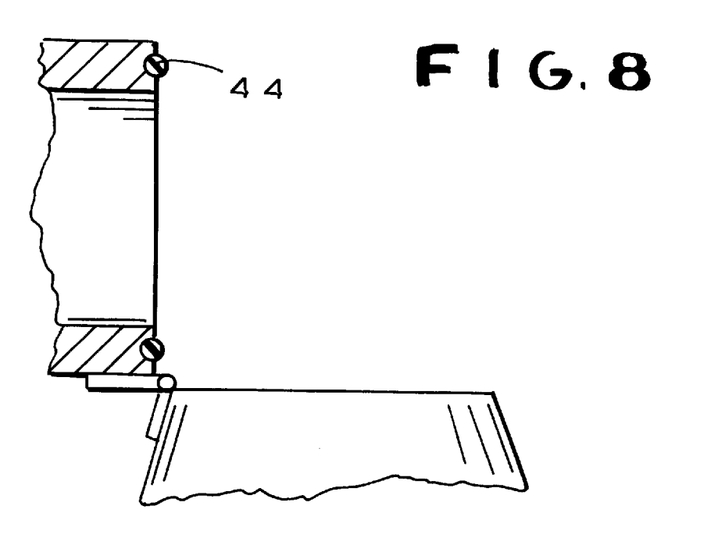
FIG. 8 is a diagram showing the seal which can be provided between the hinged segments of the duct.

As can be seen from FIG. 6, a constricted segment 31 of the duct may have a flattened region between connecting fittings 36 and 37 which can be joined to the balance of the duct by locking cams, not shown in detail but operated by the levers or arms 38 and 39. A hinge 40 can be provided between the flattened region 35 and one of the cam lock fittings 36 or 37 to afford access to knife plates 41 and 42 having blades 43 and 44, respectively extending into the path of the pieces of meat which are flattened as they are drawn through the region 35. The knife plates are insertable into the flattened section and incise the piece of meat from opposite sides.

Figure 9:
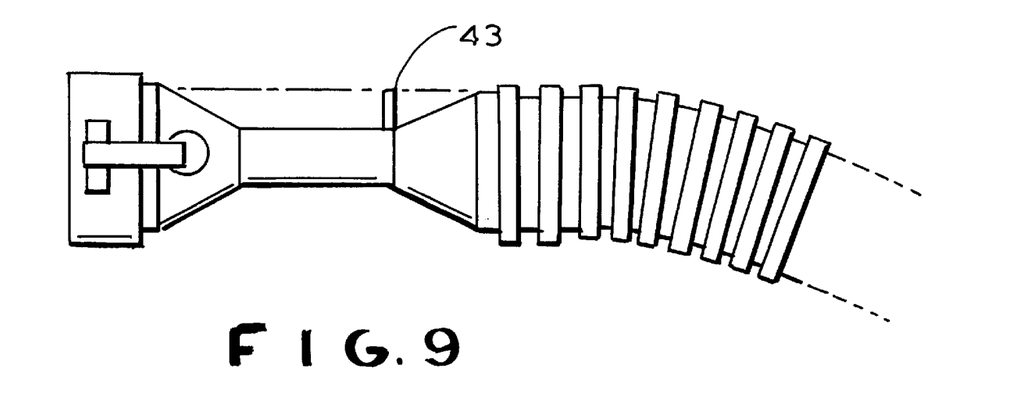
FIG. 9 is a fragmentary elevational view showing a portion of the duct.

The duct is normally closed as has been shown in FIG. 9 for passage of the pieces of meat and a latch can be provided at 43 to hold the swingable portions of the segment in align (see FIG. 9). To prevent leakage of the liquid from the duct, an o-ring seal can be provided between the two parts of the duct which are hinged together.

Figure 10:
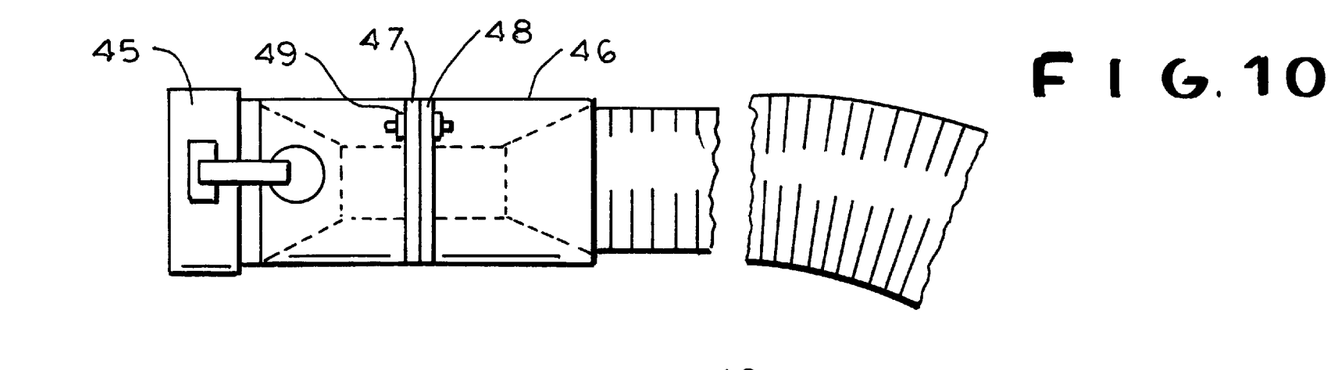
FIG. 10 is a view similar to FIG. 9 of another duct embodying the invention.
Figure 11:
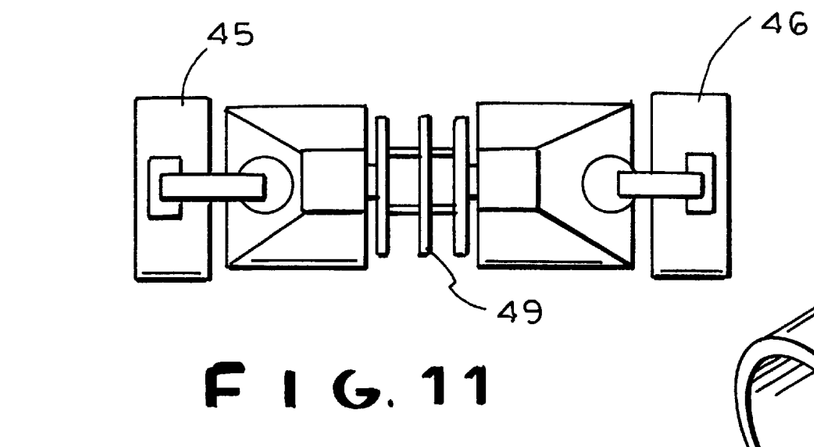
FIG. 11 is a view of this latter portion of the duct upon separation of the parts thereof to show the knife insert.
Figure 12:
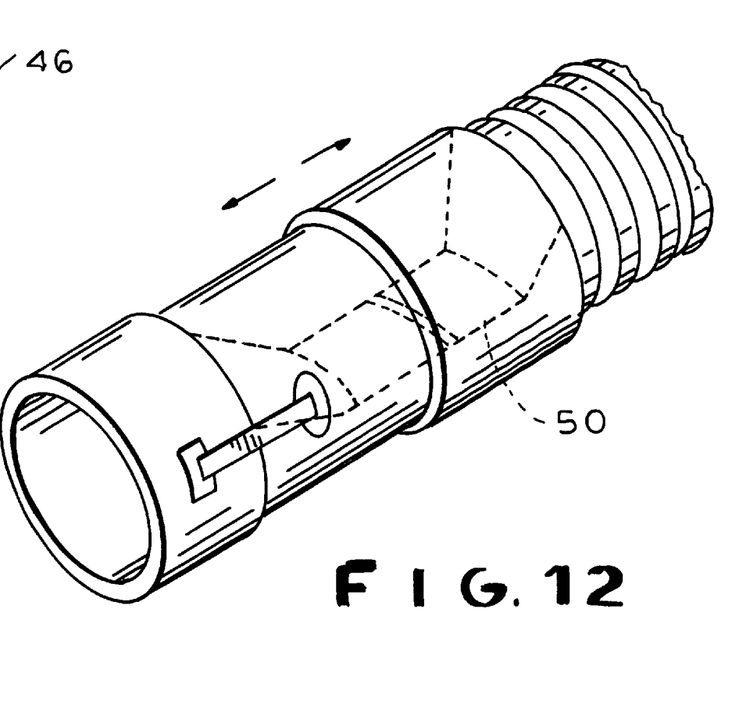
FIG. 12 is a perspective view of the latter duct.
Figures 13, 14, 15, 16:
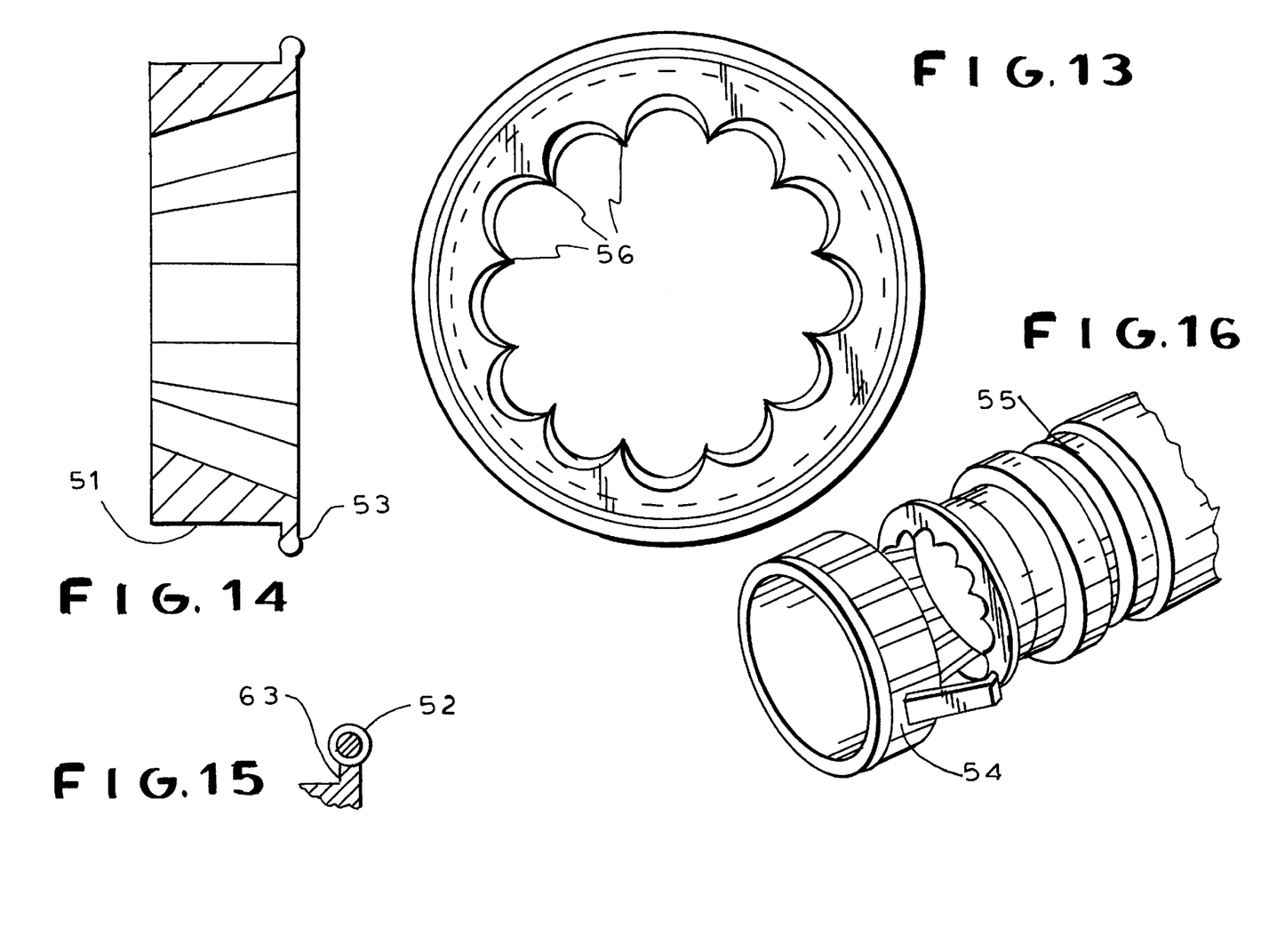
FIG. 13 is an end view of another macerating ring in accordance with the invention.
FIG. 14 is a cross sectional view thereof.
FIG. 15 is a detail view showing the o-ring seal on the latter macerating ring.
FIG. 16 is a perspective view showing the positioning of that macerating ring.

In the alternative construction shown in FIGS. 10–12, the two cam lock fittings 45 and 46 are provided with flanges 47 and 48 bolted together at 49 so that once the bolts are removed, the two sections can be separated as shown at FIG. 11 to allow access to the knife plates 41 and 42 in the flattened portion 50 of the duct segments. The parts of the duct segment are separated for knife change and washing down of the duct.

Figures 17, 18, 19:
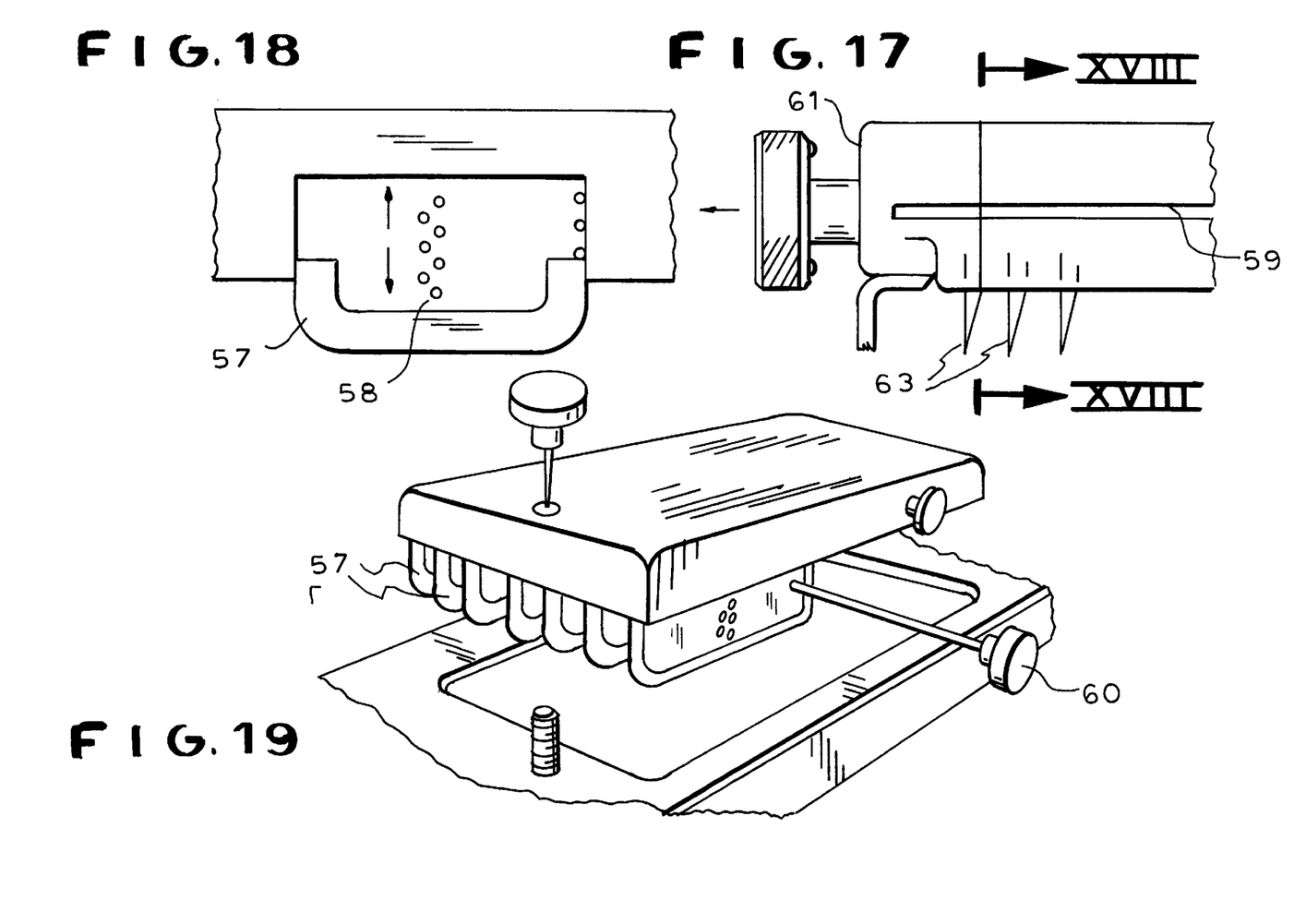
FIG. 17 is a detail view showing another blade mounting system according to the invention.
FIG. 18 is a cross sectional view taken along the line XVIII—XVIII of FIG. 17.
FIG. 19 is a perspective view of this latter blade mounting system.

Another macerating ring arrangement has been shown in FIGS. 13–16 in which the ring 51 has an o-ring seal 52 which can fit into a groove on the flange 53 and then engaged in the cam lock segments 54 and 55 (FIG. 16) when the duct segment is assembled. The ring 51 converges in the direction of displacement of the pieces of meat and is formed with a rosette of cutting edges 56, when incise the pieces of meat. When the duct is flattened in the region in which the blades are provided, the individual blades 57 can have staggered holes 58 which can be traversed by a rod 59 having a knurled ring 60 and threaded into the support by 61 so that the blades are adjustable in the supporting body as represented by the arrows 62. The depth of the blades can thus be adjusted by fitting the rod through the appropriate holes. FIG. 17 shows a plurality of blades 57 in an exploded view of the assembly. The blades, of course, having the cutting edges 63.

Figure 20:
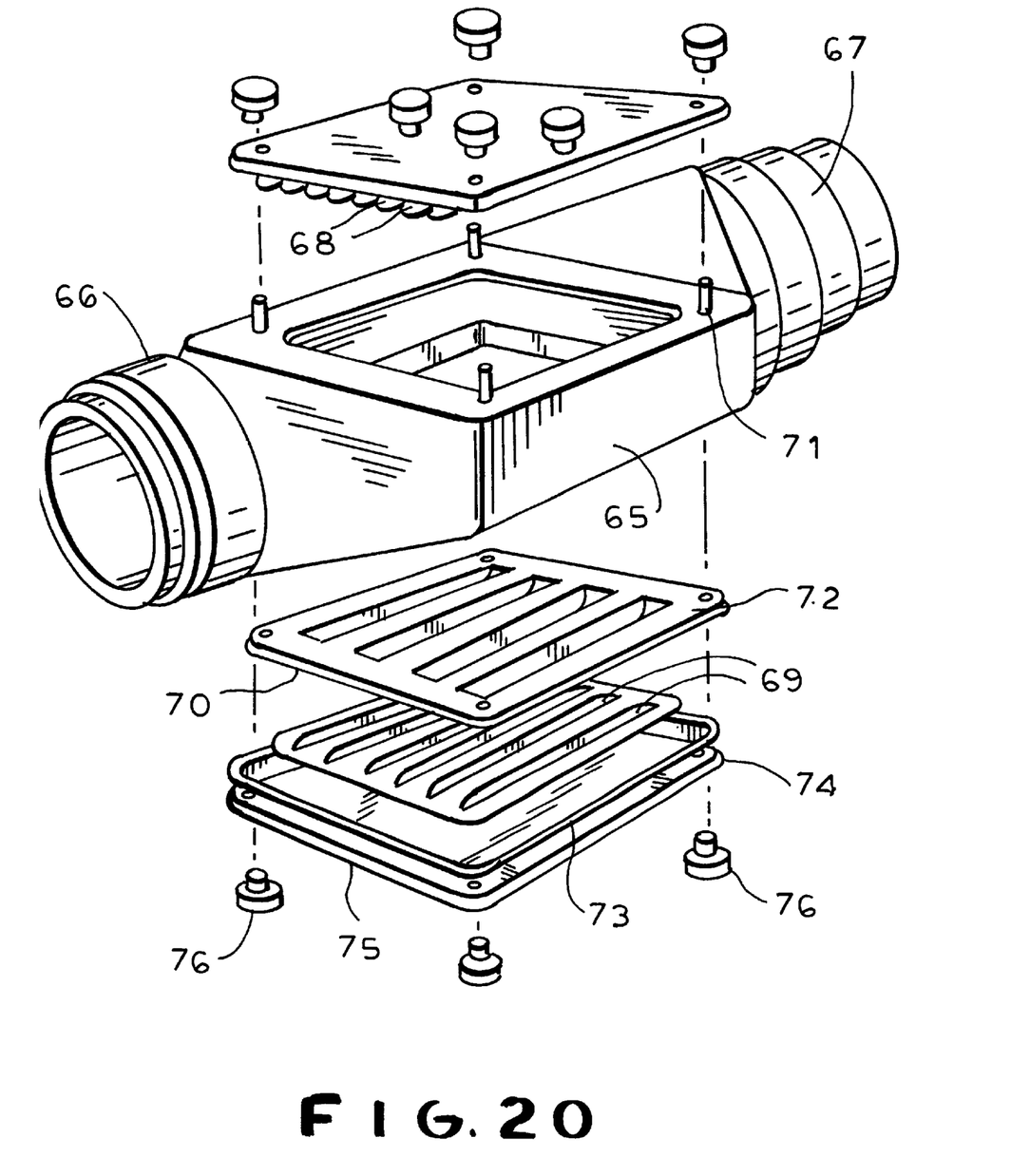
FIG. 20 is an exploded view off still another duct segment provided with incising blades.
Figure 21:
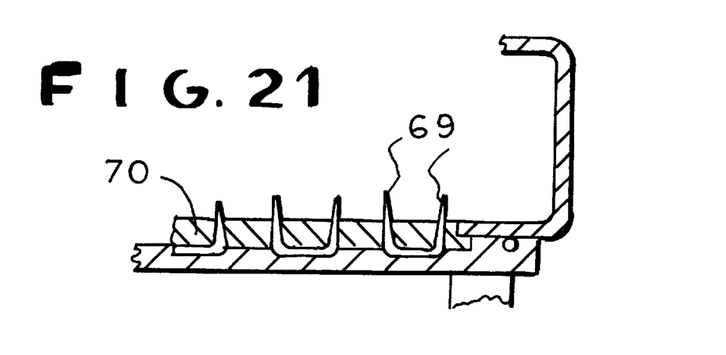
FIG. 21 is a cross section of a detail of a blade mount in accordance with the invention.

Another assembly is shown in FIGS. 20 and 21 and comprises a flattened section 65 with cam lock tubular fittings 66 and 67 at its opposite ends.

Cutting edges 68 and 69 on respective knife plates can project into the path of the pieces of meat forced through the segment by section an the blades can be held in place by knife retaining plate only one of which is visible in FIGS. 20 and 21 bolts 71 secure the plates in place and engage in holes 72 in the knife retaining plates, their holes in a gasket 73 and holes 74 in the covers 75. Knurled nuts 76 may be threaded onto the bolts 71 to hold the knives in place.

We claim:

1. A method of processing meat to tenderize same, comprising the steps of:

injecting pieces of meat with a liquid marinade;

sucking said pieces of meat in succession through a duct into a massaging and tumbling drum;

incising each piece of meat with a multiplicity of cutting edges all around each of said pieces as each piece passes through said duct; and massaging the pieces of meat incised in said duct and injected with said marinade in said massaging and tumbling drum to promote penetration of the liquid marinade into and to distribute the liquid marinade in each piece of meat.

2. The method defined in claim 1 wherein said cutting edges are arranged in a ring in said duct and extend into a path of the pieces of meat, said method comprising forcing each piece of meat by suction through said ring.

3. The method defined in claim 1 wherein said cutting edges are arranged on two flat sides of an elongated passage in said duct and extend into a path of the pieces of meat, said method comprising forcing each piece of meat by suction through said elongated passage.

4. The method defined in claim 1 wherein said pieces of meat are compressed upstream of said cutting edges and expand downstream of said cutting edges as said pieces of meat are sucked through said duct.

5. The method defined in claim 4, further comprising the step of storing said pieces of meat after injection and before the pieces are sucked through said duct in a refrigerated loading bin.

6. The method defined in claim 5, further comprising the step of cold-pressing said pieces of meat after injection and before said pieces are stored in said bin.

7. The method defined in claim 4, further comprising the step of cold-pressing said pieces of meat after injection and before said pieces are sucked through said duct.

8. An apparatus for processing meat to tenderize same, said apparatus comprising:

an injector for injecting pieces of meat with a liquid marinade;

an evacuatable paddle massager for massaging the pieces of meat injected with said marinade;

a duct between said injector and said paddle massager through which said pieces of meat are sucked for introduction into said massager; and a multiplicity of cutting edges in said duct for incising each piece of meat as each piece of meat is sucked through said duct to promote penetration of said liquid marinade into the pieces of meat.

9. The apparatus defined in claim 8 wherein said cutting edges are arranged in a ring in said duct and extend into a path of the pieces of meat.

10. The apparatus defined in claim 8 wherein said cutting edges are arranged on two flat sides of an elongated passage in said duct and extend into a path of the pieces of meat.

11. The apparatus defined in claim 8 wherein said duct has a converging portion upstream of said cutting edges for compressing said pieces of meat and a diverging portion downstream of said cutting edges.

12. The apparatus defined in claim 8, further comprising a cooled loading tank connected to said duct and receiving said pieces of meat from said injector for storing said pieces of meat after injection and before the pieces are sucked through said duct.

13. The apparatus defined in claim 8, further comprising a cold press between said injector and said duct for cold-pressing said pieces of meat after injection.

14. The apparatus defined in claim 8, further comprising a cold press between said injector and said duct for cold-pressing said pieces of meat after injection.

15. An apparatus for processing meat to tenderize same, said apparatus comprising:

an injector for injecting pieces of meat with a liquid marinade;

an evacuatable paddle massager for massaging the pieces of meat injected with said marinade; and a duct between said injector and said paddle massager through which said pieces of meat are sucked for introduction into said massager, said duct having in succession a section converging in a direction of displacement of said pieces of meat for compressing said pieces and a section diverging in said direction.

16. The apparatus defined in claim 15, further comprising a cooled loading tank connected to said duct and receiving said pieces of meat from said injector for storing said pieces of meat after injection and before the pieces are sucked through said duct.

* * * * *